(12) United States Patent
Adam et al.

(10) Patent No.: US 8,954,272 B2
(45) Date of Patent: Feb. 10, 2015

(54) METHOD AND APPARATUS FOR THE TRACKING OF MULTIPLE OBJECTS

(71) Applicant: BASELABS GmbH, Chemnitz (DE)

(72) Inventors: Christian Adam, Chemnitz (DE); Norman Mattern, Chemnitz (DE); Eric Richter, Chemnitz (DE); Robin Schubert, Chemnitz (DE)

(73) Assignee: BASELABS GmbH, Chemnitz (DE)

( * ) Notice: Subject to any disclaimer, the term of this patent is extended or adjusted under 35 U.S.C. 154(b) by 0 days.

(21) Appl. No.: 14/265,425

(22) Filed: Apr. 30, 2014

(65) Prior Publication Data

US 2014/0324339 A1    Oct. 30, 2014

(30) Foreign Application Priority Data

Apr. 30, 2013    (EP) .................................... 13166045

(51) Int. Cl.
 G01C 21/00    (2006.01)
 G06F 9/44    (2006.01)
 G01S 13/72    (2006.01)
(52) U.S. Cl.
 CPC .................................. G01S 13/726 (2013.01)
 USPC ........................................... 701/519; 706/52
(58) Field of Classification Search
 USPC ............ 701/519, 509, 29.7–31.1; 706/52, 45; 356/4.01; 382/103–107, 162
 See application file for complete search history.

(56) References Cited

U.S. PATENT DOCUMENTS 7,460,951 B2 * 12/2008 Altan et al. ................... 701/536
7,747,084 B2   6/2010 Picard 2005/0225477 A1   10/2005 Cong
2009/0187527 A1 *  7/2009 Mcaree et al. .................. 706/52
2009/0231183 A1   9/2009 Nettleton
2010/0191391 A1 *  7/2010 Zeng ................................ 701/1
2010/0322480 A1 * 12/2010 Banerjee et al. .............. 382/103

(Continued)

FOREIGN PATENT DOCUMENTS

DE    102006045115    4/2007
EP        1634241    3/2006

(Continued)

OTHER PUBLICATIONS

Michael Munz et al "A Sensor Independent Probabilistic Fusion System for Driver Assistance Systems", Intelligent Transportation Systems, 2009, pp. 1-6.

(Continued)

*Primary Examiner* — Muhammad Shafi
(74) *Attorney, Agent, or Firm* — 24IP Law Group; Timothy R DeWitt

(57) ABSTRACT

Tracking systems using multi-object-tracking (MOT) combine data from a plurality of sensors (101) to derive a state estimate of one or more objects (103) are described. The interfaces to the sensors (101) are such that different ones of the sensors (101) can be used. The tracking (102) in the system consists of different blocks for state estimation (104), object's existence estimation (106), and data association (105). To utilize the data of a sensor, the sensor data and the system which is observed is modeled using the Bayesian filtering framework. All interfaces of the system, i.e. the interfaces between the sensors (101) and the MOT system as well as of the blocks in the MOT are of a characteristic that ensures that only compatible models are used with each other already when designing the system.

8 Claims, 4 Drawing Sheets

(56) References Cited

U.S. PATENT DOCUMENTS

2012/0062747 A1* 3/2012 Zeng ............................. 348/149
2012/0239582 A1* 9/2012 Solari et al. ................... 705/306
2012/0310987 A1 12/2012 Dragojevic

FOREIGN PATENT DOCUMENTS

WO 2004111938 12/2004
WO 2013009710 1/2013

OTHER PUBLICATIONS

Eric Richter "Non-Parametric Bayesian Filtering for Multiple Object Tracking" (ISBN: 978-3-8440-1488-4).
Schubert "Integrated Bayesian Object and Situation Assessment for Lane Change Assistance" (ISBN: 978-3-8440-0322-2).
R. Schubert, C. Adam, E. Richter, S. Bauer, H. Leitz and G. Wanielik, "Generalized Probabilistic Data Association for Vehicle Tracking Under Clutter", In Intelligent Vehicles Symposium (IV), 2012 IEEE, Alcala De Henares, Spain, Jun. 2012.

* cited by examiner

METHOD AND APPARATUS FOR THE TRACKING OF MULTIPLE OBJECTS

BACKGROUND OF THE INVENTION

1. Field of the Invention

The invention relates to a method and apparatus for the determination and tracking of multiple objects.

2. Brief Description of the Related Art

The acronym MOT used in this application stands for Multiple Object Tracking. The acronym PDF used in this application stands for Probability Density Function. The acronym ADAS in this application stands for Advanced Driver Assistance Systems.

M. Munz, K. Dietmayer, and M. Mählisch, "A Sensor Independent Probabilistic Fusion System for Driver Assistance Systems," in Proceedings of the 12th International IEEE Conference on Intelligent Transportation Systems (ITSC 2009), St. Louis, Mo., U.S.A, October 2009 teach a so-called probabilistic fusion framework for implementing a sensor independent measurement fusion. The probabilistic fusion framework enables exchange of sensors (101) used in a multiple object tracking system for the tracking of objects. A sensor of type A can be replaced by a sensor of type B without changing the measurement fusion itself. The interfaces used in this paper described probabilistic descriptions of measurement and existence uncertainties. The work of Munz at al aims at defining one generic interface between a sensor model and the multiple object trackers. The modules for state estimation of the tracked objects, existence estimation of the tracked objects, and associations of data delivered by the sensor with tracked objects, of the multiple object tracker are not modularized. The general interface described in the work of Munz et al is restricted to a Gaussian representation of the spatial measurement distribution and a binary cardinality distribution for both the clutter and the measurements. Munz et al do not describe an arbitrary PDF for the spatial distribution of sensor measurements as well as arbitrary probability distributions for the cardinality models.

International Patent Application No. WO2004111938 teaches a method for object recognition in a driver aid system for motor vehicles. The method of the '938 discloses fusion of data of different sensors to obtain a Maximum A-Posteriori (MAP) estimate. The MAP estimate is a point estimate of a probability density function. In case of Gaussian distribution, the MAP estimate coincides with the mean of the Gaussian. The method of the '938 disclosure implements one type of the MOT and statically defines all of the interfaces between processing blocks. It does not facilitate any exchange of the processing blocks.

Similarly, the European patent application EP1634241 also describes a MOT for the fusion of radar data and camera data. The interfaces between the processing blocks taught in the '241 application are not of generic nature.

German Patent Application DE102006045115 claims a generic MOT using only Gaussian functions to describe the PDF.

U.S. Pat. No. 7,460,951 claims a MOT with a system model. This US patent fails also to disclose a generic interface structure of the disclosed system. U.S. Pat. No. 7,747,084 claims a structure for the MOT but fails to teach verification of the configuration of the MOT during the MOT's development.

A publication by Eric Richter—Non-Parametric Bayesian Filtering for Multiple Object Tracking (ISBN: 978-3-8440-1488-4) teaches case studies that describe different implementations of MOTs. The first of these case studies proposes an implementation based on data fusion between data from radar and camera sensors. The teachings of this publication fail to describe neither generic interfaces nor the proposed modularization.

Schubert—Integrated Bayesian Object and Situation Assessment for Lane Change Assistance (ISBN: 978-3-8440-0322-2) proposes interfaces between MOTs and Bayesian networks that are used for assessing the relationships between different objects. These interfaces can be used to pass the results of an MOT to a subsequent system that takes automatic decisions based on the current situation or utilize situation information for influencing the object tracking modules. However, the publication does not contain any interfaces within an MOT nor the proposed modularization.

A further discussion is to be found in R. Schubert, C. Adam, E. Richter, S. Bauer, H. Lietz, and G. Wanielik, "Generalized probabilistic data association for vehicle tracking under clutter", in Intelligent Vehicles Symposium (IV), 2012 IEEE, Alcala de Henares, Spain, June 2012

SUMMARY OF THE INVENTION

The tracking system of this disclosure can be used in an advanced driver assistance system (ADAS) of a vehicle, the environment perception, which detects and tracks objects in the surrounding of the host system based on sensor data, of a mobile robot or an autonomous vehicle. The objects can be moving, movable or stationary. In the context of the invention, the term "tracking" means determining objects in future measurements. The determining of the object hypotheses is carried out by taking a sequence of measurements from different sensors and inferring from this sequence of measurement a state of the object. The different sensors include, but are not limited to, sensors providing video data (or data derived from the video sensors such as information about objects already identified), radar data (e.g. azimuth, distance, range rate, i.e. radial velocity), laser scanner data (e.g. azimuth, distance, optional radial velocity), ultra sonic sensors, or depth image cameras. The object's state is, for example, the position, heading and velocity of the object as well as a probability that a generated object hypothesis represents an object that exists in reality and was not caused by a faulty sensor measurement.

The tracking system can derive decisions from the object hypotheses to stop automatically a vehicle or a robot using the tracking system. The tracking system should not only consider the objects state's mean values, e.g. the position, heading and velocity of the object, but also the probability that the vehicle or the robot is actually located elsewhere and the probability that the object exists (or even not exists).

Different models can be applied to derive the values of the objects states from the sensor data. These values are stored in memory in a "state space". The state space comprises a plurality of vectors with elements that represent the quantities to be estimated. The vector could include, for example, elements representing the current x and y positions of the object, an angular quantity for the heading of the object and the velocity of the object. This exemplary vector would result in a four-dimensional state vector for each one of the objects.

A "system model" describes how the objects states, given by instances of the state spaces, are expected to evolve over time. A vehicle may, for example, move with both constant velocity and constant heading.

A "measurement space" is a vectorial representation of the quantities measured by a particular one of the sensors. For example, a simple radar may only observe an azimuth and range between the radar sensor and a target (such as one of the objects). This results in a two-dimensional measurement space. The elements of this two-dimensional measurement space are the azimuth and the range to an identified one of the objects.

A "measurement model" describes how a particular one of the sensors measures the objects states. For example, the measurement model describes how the position, heading and velocity of objects transform to azimuth and range of the simple radar example above.

The data from the sensors are subject to noise. An example using the radar will illustrate this point. Suppose that the radar measures the same object two times substantially at the same time. The measured values derived from the radar will differ from each other. This difference is, for example, due to shortcomings in the radar (or other sensor).

The determined objects states do not comprise a single set of values. The objects states are rather probability density functions. The probability density that an object takes a certain state can be derived from the probability density functions. The probability density function can be represented by different ways, referred to as an "uncertainty representation". One example of a probability density function is a Gaussian function, which is defined in a parametric manner (i.e. defined by reference to explicit parameters). The Gaussian functions are defined by their parameters mean value and, in multi-dimensional case, the co-variance matrix.

Sampling based methods approximate the probability density function by so-called samples. The density of the samples at certain locations enables an approximate determination to be made of the current density of the probability density function.

When the tracking system tracks multiple ones of the objects, the tracking system is additionally facing another problem, which is termed "data association". Let us suppose that two objects are tracked by the tracking system. One example of the two objects would be two vehicles that are driving side by side in front of a host vehicle onto which the radar is mounted. The two vehicles' state space comprises the position, heading and velocity of the individual ones of the two vehicles. The radar measurement space is the azimuth and the range of the radar. The tracking system now needs to associate two different radar measurements, i.e. one for each of the two vehicles, given by azimuth and range, to the two different vehicles, given by the position, heading and velocity. The tracking system needs also to handle the cases when new ones of the objects (vehicles) appear or disappear in the detection area of the radar. The tracking system also needs to handle the case of superfluous objects (i.e. detection where no objects are present) or missing objects (object present but no detection).

Currently the advanced driver assistance systems use partly monolithic and partly tailored tracking systems. The state space, the system model, the measurement space, the measurement model, the uncertainty representation, the data association are defined once during a development process. A tailored processing chain is created. The state space, the system model, the measurement space, the measurement model, or the uncertainty representation interact with each other in the processing chain. For example, the system model reads and writes the state vectors defined in the state space. The measurement model can read the state vector and writes elements into a measurement vector defined by the measurement space. The system model and the measurement model will use the uncertainty representation to change an uncertainty in the values, as described below.

The different stages of the processing chain are based on manifestations of the state space, the system model, the measurement space, the measurement model, or the uncertainty representations. For example, the tracking system may use a two-dimensional radar sensor, which detects the azimuth and the range of the objects. The uncertainty in the measurement values of the azimuth and the range of the object is represented by a Gaussian function. The state space of the objects may be the position, heading and velocity of the objects. The uncertainty in the position, heading and velocity is represented by samples. The interaction of the stages of the processing chain is now based on the concrete manifestation of state space, the system model, the measurement space including their probabilistic noise characteristics, the measurement model, or the uncertainty representation.

However, if one of the state space, the system model, the measurement space, the measurement model, or the uncertainty representation in the tracking system needs to be changed, the processing chain can be corrupted by incompatible state spaces, system models, measurement spaces, measurement models, or the uncertainty representations, as one or more of the state spaces, system models, measurement spaces, measurement models, or the uncertainty representation may no longer be compatible with another one of the state spaces, system models, measurement spaces, measurement models, or the uncertainty representation. For example, the state space of the object may be defined as the position, heading and velocity of the object. The system model is initially constant velocity and constant direction of the object. If the system model is now changed in a way that is designed to take into account additionally an acceleration of the object, this will not fit to the current state space, as the state space contains no information about the current acceleration of the object. This example would occur in the ADAS tracking system which considers scenarios in which the vehicles often accelerate and decelerate, which is then be better covered by the system model considering acceleration and deceleration rather than assuming the constant velocity of the vehicles.

The situation is similar for the measurement models. For example, a "legacy" radar sensor detects the objects' azimuth and range. The ADAS processing chain including tracking is tailored for that legacy radar sensor. A new generation of radar sensors additionally providing detection of radial velocity of the object, for example by considering the Doppler shift, might become available. The measurement space and the measurement model both need to be adapted to take into account this new generation of radar sensor. This adaption can cause incompatibilities with the state space, requiring revision of the processing chain, which is a time consuming process.

The data association is in current systems specific for the tracking system, as the data association is tailored to the state space, the measurement space, the measurement model, the uncertainty representation, and the data association algorithm itself. If one or more of the state space, the measurement space, the measurement model, the uncertainty representation change, for example due to changes in the types of sensors used or the designs of the sensor, the data association needs to be revised. Similarly suppose that the ADAS tracking system needs to use more complex methods generating better results (at the price of being more complex), then the data association will also need to be revised, which is a time consuming process.

It would therefore be advantageous to design a method and apparatus for the determination and tracking of objects which would allow adoption to changing requirements of the tracking system, i.e. changing sensors—i.e. changing measurement spaces, measurement models, and sensor measurement uncertainty representation—and changing, for example, the need for other state spaces, system models, uncertainty representations, or data association methods.

The development of the environment model (state spaces, system models, measurement spaces, and measurement models), MOT, and the uncertainty representation, which form the basis of systems like Advanced Driver Assistance Systems (ADAS), today takes place in a monolithic manner. Once such tracking system is developed, the used environment models as well as the algorithms cannot be easily changed and the complete ADAS may need to be re-programmed. This disclosure teaches a modular system structure, which provides configurable and therefore exchangeable environment models as well as exchangeable methods and algorithms to handle uncertainties ("uncertainty representation").

The method and apparatus can be used in a vehicle assistance system such as those used by land-based vehicles (including cars, lorries and robots), sea-based vehicles and air-based vehicles.

BRIEF DESCRIPTION OF THE DRAWINGS

For a more complete understanding of the present invention and the advantages thereof, reference is now made to the following description and the accompanying drawings, in which.

DETAILED DESCRIPTION OF THE INVENTION

The invention will now be described on the basis of the drawings. It will be understood that the embodiments and aspects of the invention described herein are only examples and do not limit the protective scope of the claims in any way. The invention is defined by the claims and their equivalents. It will be understood that features of one aspect or embodiment of the invention can be combined with a feature of a different aspect or aspects and/or embodiments of the invention.

Figure 1:
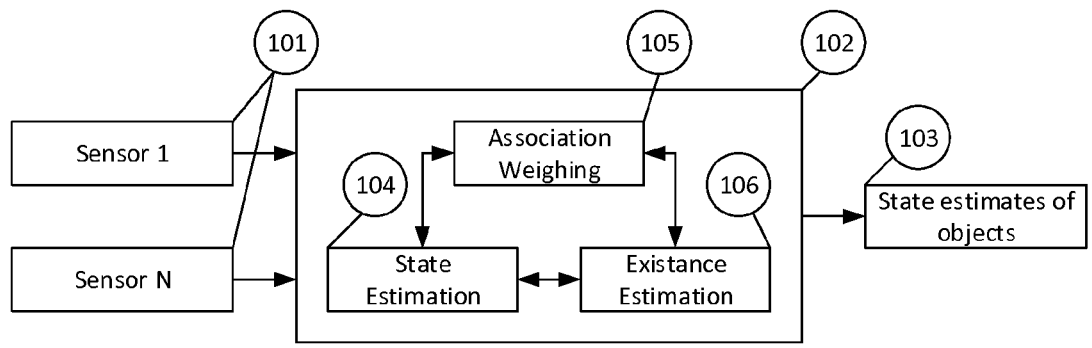
FIG. 1 shows a generalized structure of the system of the disclosure.
Figure 5:
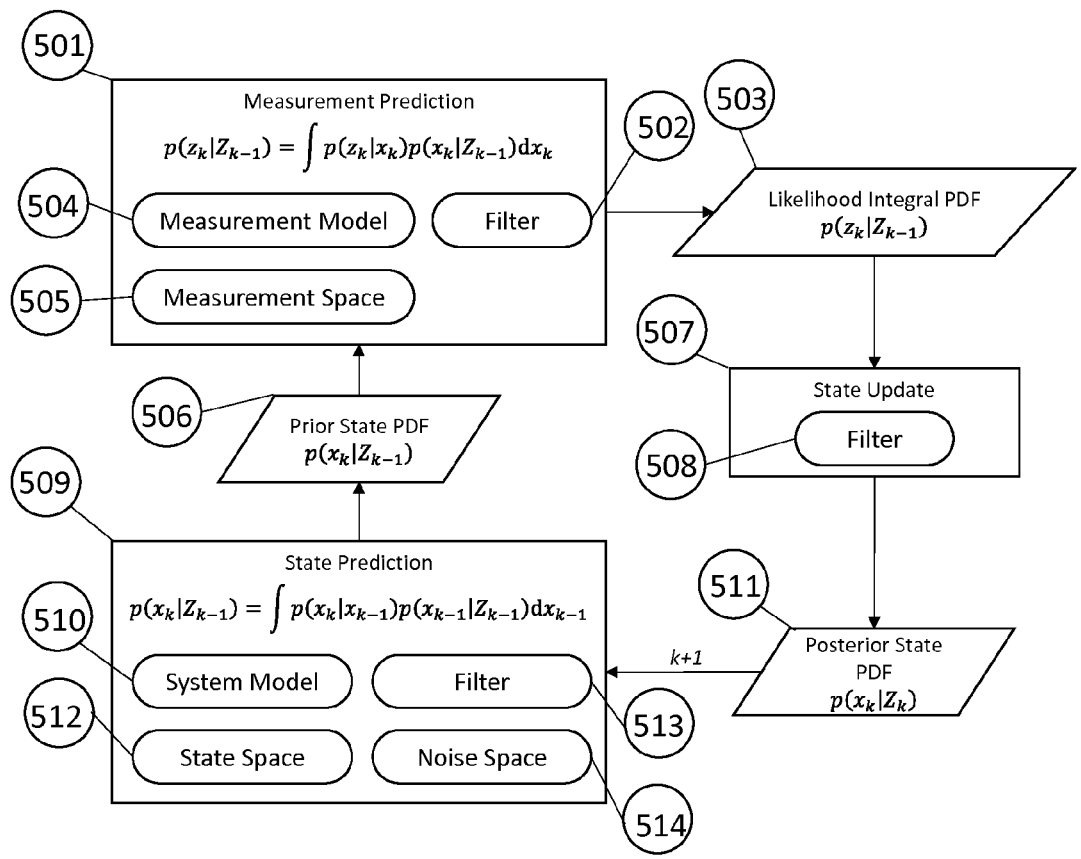
FIG. 5 shows a Bayes filtering process including configurable spaces.

FIG. 1 shows a tracking systems using multi-object-tracking (MOT) that combines data from a plurality of sensors 101 to derive a state estimate of one or more objects 103. The interfaces to the sensors 101 are such that different ones and different types of the sensors 101 can be used. The tracking 102 in the system consists of different blocks for state estimation 104, the object's existence estimation 106 and data association 105 To utilize the data of the sensor 101, the sensor data and the system which is observed is modeled using the Bayesian filtering framework and can be stored in a memory in the system. All interfaces of the system, i.e. the interfaces between the sensors 101 and the MOT system as well as of the blocks in the MOT are of a characteristic that ensures that only compatible models are used with each other already when designing the system FIG. 5 shows the MOT system in more detail. The plurality of blocks shown in FIG. 5 form the basis of the modular system used in this disclosure: spaces (including a measurement space 505, a state space 512 and a noise space 514), distributions (e.g. a Gaussian distribution, as a likelihood integral PDF 503, a posterior state PDF 511, and a prior state PDF 506), models (e.g. a measurement model, 504 and a system model 510), and filters (e.g. Kalman filters, 502, 508, 513). The plurality of blocks 501, 507 and 509 are designed in a way to be close to mathematical and probabilistic expressions so that ones of the plurality of blocks map onto the theoretical basics of probability theory, Bayesian reasoning, and Bayesian filtering. Generic interfaces for the plurality of blocks (501, 507, and 509) are provided so that the plurality of blocks 501, 507 and 509 can be combined in several ways to build up and configure a system used in this disclosure. The generic interfaces of the plurality of blocks 501, 507 and 509 are designed in a way that only the distributions 503, 506 and 511, the models 504 and 510, the filters 502, 508 and 513, and the algorithms, which are compatible and valid, can be combined with each other. For example, the resulting Gaussian distribution 511 and 506 of the Kalman filters 508 representing the state update 507 and the Kalman filter 502 in the measurement prediction block 501 will have the same dimensionality as the measurement space 505 and the state space 512 used to describe the problem in the system 510 or the measurement models 504.

FIG. 5 represents one example of a Bayes filter for state estimation for one instance of a track, as will be explained below. It will be seen that the measurement the plurality of blocks 501, 507, and 509 forms a closed loop to update the various states of the tracks. A measurement is made in the measurement prediction block 501 using a prior state PDF 506, the measurement model 504 and the measurement space 505. The Bayes filter 502 uses the results of the measurement model 504 and the measurement space 504 to produce a likelihood integral PDF representing the measured track of a movable object. This is fed to the state update block 507 and filtered by the Kalman filter 508 to produce the posterior state PDF 511 which is in turn fed to the state prediction block 509. The state prediction block 509 uses the system model 510, the state space 512, the noise space 514 and the Kalman filter 513 to update the prior state PDF 506, that is then fed to the measurement prediction block 501. The method can begin again.

Spaces

Figure 2:
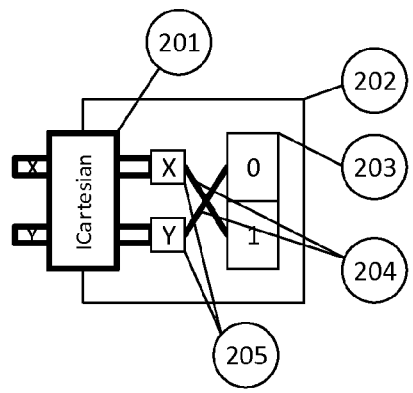
FIG. 2 illustrates a dimension interface to an access space vector.
Figure 3:
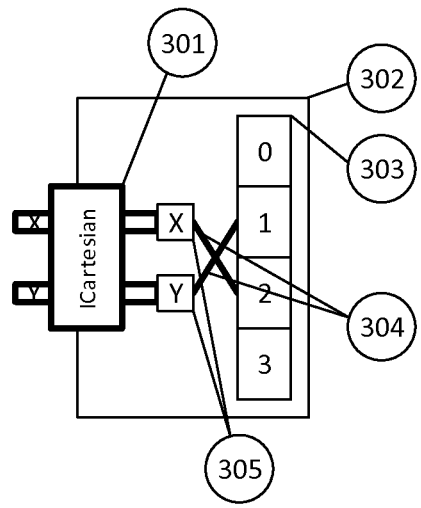
FIG. 3 illustrates dimension accesses to different indices of a space vector.

The spaces, such as the measurement space 505, the state space 512, the noise space 514 as well as the space 202 shown in FIG. 2 and the space 302 shown in FIG. 3 are used to represent sets of numerical values abstracted from physical quantities obtained from measurements, as will be described later. Each of the space comprises one vector (shown as 203 and 303) with a constant number of elements for the vector within that space. The elements of the space are termed dimensions. Each one of the dimensions has an identifier (shown labeled X and Y in 205 and 305), which is unique within that space and is normally set to the physical or mathematical symbol of the physical quantity represented by the space An example of a space is the two-dimensional Cartesian space with the dimensions x and y (as illustrated in FIG. 2). In Bayesian filtering, two types of space are commonly present. The state space x represents the state of a tracked object. For example, when an object is tracked, the position, heading and velocity of the object are often of interest and therefore used as state space. This simple example of the state space will have a plurality of vectors with values representing the position, heading and velocity of the object being tracked.

The measurement space z (shown as 505 on FIG. 5) contains the measurement from one of the sensors 101 observing the tracked object. The measurement space of a radar as the sensor 101 comprises, for example, the azimuth, range, and range rate (i.e. radial velocity) of the tracked object. A simple GPS receiver as the sensor 101 may use a three-dimensional position, i.e. three separate components, as the measurement space. This simple example of the measurement space will have a plurality of vectors representing the azimuth, range and range rate (for the radar) or three-dimensional position for the GPS receiver.

The noise space v typically contains system error quantities. For values obtained from the measurement of the tracked object, this space is called the measurement noise space w and is shown as 514 on FIG. 5.

Table 2 (below) shows different examples of definitions of the state space commonly used for tracking systems for the ADAS.

The dimensions of the space may represent physical quantities. For example, the 'position, heading, velocity' all dimensions represent physical quantities. The dimensions are then named "v" for a velocity or "x" for an x-component of a position. The different spaces use dimensions with similar designations, i.e. quantities with the same name, unit, and description, but the dimensions will have different indices in the space. For example, a two-dimensional Cartesian space has two dimensions X and Y, each one of the dimensions representing a physical quantity and using units meter and having a description. A space for describing the position, heading, and velocity of the tracked object will also have two dimensions X and Y using the same units and having the same description, but the space will also comprise an additional dimension G for the heading of the tracked object (described by the unit degrees, for example) and an additional dimension V for the velocity of the tracked object (described by the unit m/s). The dimension interfaces 201 and 301 of the spaces 202 or 302 make the dimensions in the state vector 203 and 303 addressable (as shown by the lines 204 and 304) by their identifiers (e.g. 205, 305) with descriptions and units.

The use of the similar identifiers (205 and 305) for the dimensions in each of the spaces 202, 302, 505, 512, and 514 means that any one method works will work in every one of the spaces 202, 302, 505, 512 and 514. For example, the X and Y (205, 305) dimensions representing Cartesian coordinates will have identical identifiers in each of the spaces 202, 302, 505, 512 and 514, as discussed in the example above and shown in FIG. 3.

A dimension interface, such as the dimension interfaces 201 and 301, is an interface, which makes the properties of the dimension accessible. For example, the space vector 303 shown in FIG. 3 is accessed from outside of the space 302 via the dimension interface 301. The configurable parts (501, 507, 509) of the tracking system can be restricted to accept only spaces and the configurable parts (501, 507, 509) of the tracking system can specify an arbitrary number of dimension interfaces (e.g. 201) that the space (e.g. 202) has to implement. Table 1 shows different examples of the dimension interfaces commonly used for the tracking systems for the ADAS.

TABLE 1

Different exemplary dimension interfaces of the tracking system

| Interface | Properties | Units | Description/Application | Prototype space |
|---|---|---|---|---|
| IAcceleration | A | m/s² | Acceleration value | |
| IAccelerationComponents | Ax | m/s² | Acceleration components | |
| | Ay | m/s² | in the 2D Cartesian plane | |
| IAltitude | Altitude | M | Altitude over the plane | |
| IAngularAcceleration | Alpha | rad/s² | Angular acceleration | |
| ICartesian | X | m | Two-dimensional | CartesianSpace |
| | Y | m | Cartesian Position | |
| IHeading | G | Rad | Heading | HeadingSpace |
| IJerk | J | m/s³ | Jerk value (rate of change of acceleration | |
| IJerkComponents | Jx | m/s³ | Jerk components in the 2D | |
| | Jy | m/s³ | Cartesian plane | |
| IPolar | Range | m | 2D polar coordinates | |
| | Phi | rad | | |
| IRadialVelocity | Radial-Velocity | m/s | Velocity component along a radius | |
| IVelocity | V | m/s | Velocity value | VelocitySpace |
| IVelocityComponents | Vx | m/s | Velocity components in | Velocity- |
| | Vy | m/s | the 2D Cartesian plane | ComponentsSpace |
| IYawRate | W | rad/s | Yaw rate, angular velocity | YawRateSpace |

TABLE 2

Exemplary spaces used for application in a tracking system

| Space | Dimensions | Units | Application | Implemented Dimension Interfaces/ Derived Space |
|---|---|---|---|---|
| CartesianSpace | X | m | State space for the 2D constant position model (CPModel) or measurement space for the PositionMeasurementModel | ICartesian |
| | Y | m | | |
| CartesianSpace3D | X | m | Measurement space for the PositionMeasurementModel3D | CartesianSpace, IAltitude |
| | Y | m | | |
| | Altitude | m | | |

TABLE 2-continued

Exemplary spaces used for application in a tracking system

| Space | Dimensions | Units | Application | Implemented Dimension Interfaces/ Derived Space |
|---|---|---|---|---|
| TRASpace | X | m | State space for the constant | ICartesian, |
| | Y | m | acceleration and turn rate | IHeading, |
| | G | rad | model (CTRAModel) | IVelocity, |
| | V | m/s | | IAcceleration, |
| | A | m/s$^2$ | | IYawRate |
| | W | rad/s | | |
| CTRVSpace3D | X | m | State space for the constant | CTRVSpace, |
| | Y | m | turn rate and velocity | IAltitude |
| | G | rad | model with constant | |
| | V | m/s | altitude (CTRVModel3D) | |
| | W | rad/s | | |
| | Altitude | m | | |
| CVSpace3D | X | m | State space for the constant | CVSpace IAltitude |
| | Y | m | velocity model with value | |
| | G | rad | and direction and constant | |
| | V | m/s | altitude | |
| | Altitude | m | (CVVectorialModel3D) | |
| HeadingSpace | G | rad | Measurement space for the HeadingMeasurementModel | IHeading |
| RadarSpace | Range | m | Measurement space for the | IPolar, |
| | Phi | rad | RadarMeasurementModel | IRadialVelocity |
| | Radial Velocity | m/s | | |
| VelocityComponents-Space | Vx | m/s | Process noise space for the | IVelocity-Components |
| | Vy | m/s | 2D constant position model (CPModel) | |
| VelocitySpace | V | m/s | Measurement space for the VelocityMeasurementModel | IVelocity |
| YawRateSpace | W | rad/s | Measurement space for the YawRateMeasurementModel | IYawRate |

Matrices

Figure 4:
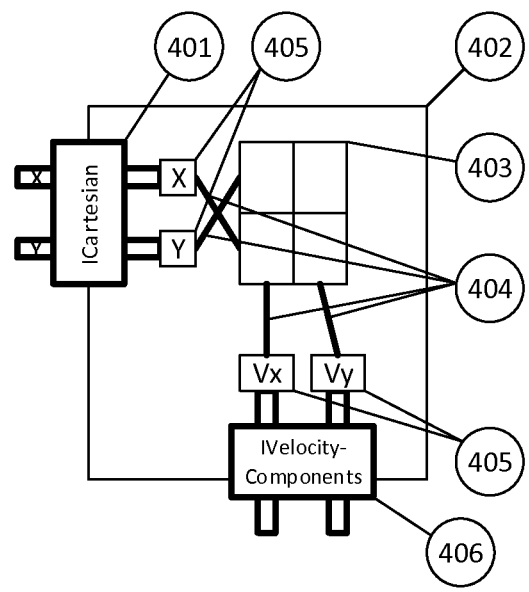
FIG. 4 illustrates the handling of a matrix.

Matrices are rectangular arrays of numbers. The matrices are applied as covariance matrices of distributions and the representation of linear equation systems in models. To comply with the so-called principle of space safety (which will be described in more detail later), the dimensions of matrices used in the course of estimation are defined by two concrete spaces: the column space and the row space. The column spaces define the meaning of the elements in vertical direction, i.e. it specifies the number of rows. Similar, the row space defines the meaning of the elements in horizontal direction and, therefore, the number of columns. FIG. 4 shows an example of a 2×2 matrix 403 with four elements. Each of the elements of the matrix 403 can be addressed both directly by indices of the element as well as by the dimension property 405. In the example of FIG. 4 the elements can be addressed by the indices, such (1, 0), (0, 1), (0, 0) and (1, 1). The elements can also be addressed by the elements name, such as X and Y (representing Cartesian coordinates) or Vx and Vy (representing velocities in the X-axis and the Y-axis). The interfaces 401 and 406 enable the access of the elements without the need to specify the exact row and column space, but only their dimension interfaces. 404 maps the dimension interfaces 401 and 406 to the matrix 403.

Uncertainty Representation

Probability density functions (PDF) are uncertainty representations which describe a relative likelihood of a value of a continuous random variable and are denoted as p (x). The PDFs are denoted as distributions. Most of the algorithms and blocks in the disclosed system use PDFs as either inputs, outputs, or both. The algorithms have different requirements for the PDFs, e.g. the Kalman filter expects a Gaussian distribution. The disclosed system maps these requirements to the following interfaces:

TABLE 3

Distribution interfaces

| Interface | Description/Application |
|---|---|
| IExpectation | Indicates that a PDF is characterized by an expectation vector, i.e. a vector in which each dimension contains the expectation value of its underlying quantity. |
| ICovariance | Indicates that a PDF is characterized by a covariance matrix. |
| IEvaluable | Specifies a PDF over a random variable as evaluable, that is, the probably density can be calculated for an arbitrary value of this random variable. |
| IDrawable | Specifies a PDF as drawable, that is random samples can be drawn from the distribution. |

If a random variable x depends on the value of another random variable z, then x is conditioned on z indicated by the | operator in the conditional PDF p(x|z). Conditions of distributions are parameters, which influence the results of output properties or methods like the evaluation of a PDF.

The disclosed system uses the following interfaces for conditional PDFs:

TABLE 4

Conditional distribution interfaces

| Interface | Description/Application | Implemented by |
|---|---|---|
| IConditional<TCondition, . . . > | Exposes the condition of a conditional probability distribution with one or more conditions. | SystemModel, MeasurementModel |
| IPreevaluatedConditional<TCondition> | Represents an evaluable conditional probability distribution with one condition where the sample at which the PDF is evaluated is already defined and cannot be changed. | ExistenceLikelihood |
| ITimeConditional | Exposes the time span condition of a conditional probability distribution with time condition. | SystemMode |
| ILinearTransition<TSpace, TCondition> | Exposes the linear transition matrix of a special conditional distribution, whose expectation vector depends linearly on the first condition. | SystemModel, MeasurementModel |

Often, a PDF p(z|x) needs to be marginalized so that $p(z)=\int p(z|x) p(x) dx$. In simple terms, each possible realization of x is set as condition in p(z|x) and its value for a given sample of z is multiplied with the probability of the realization p(x). The sum of all these values is the sample probability p(z). In general, no closed-form analytical solution of this equation exists for arbitrary continuous distributions. Nevertheless, for special combinations of conditional PDFs and the distributions of the conditions, approximate solutions or closed-form solutions can be formulated.

The disclosed system provides known mechanisms, which determine an approximate or closed-form solution for different types of conditional PDFs with one or more conditions, which can be seen in Table 5. For example, the well-known Kalman filter calculates the exact solution for a Gaussian conditional distribution whose condition is Gaussian distributed as well.

TABLE 5

Marginalization of different types of conditional PDFs and their implementation

| p(z) | p(z|x) | p(x) | Implementation |
|---|---|---|---|
| SampleSet | IEvaluable | SampleSet | Histogram filter, MCMC |
| Gaussian | ILinearTransition, ILinearOnly | Gaussian | Kalman filter |
| Gaussian | ILinearTransition, IExpectation, ICovariance | Gaussian | Extended Kalman filter |
| SigmaPoints | IExpectation | SigmaPoints | Unscented transformation |
| SampleSet | IDrawable | SampleSet | Particle filter |

Models

The Models are used to describe and estimate systems. There are two main types of models, system models, such as 510, and measurement models, such as 504. The system models 510 describe how a dynamic system evolves over time and the measurement models 504 describe the relation of a state space and its expected measurement from the sensor.

The system models 510 are special Conditional Distributions over the state $x_k$, which are conditioned on the previous state $x_{k-1}$, that is the Conditional Distribution is formally $p(x_k|x_{k-1})$. This enables temporal behavior, like motion of the tracked object, to be described. Let us assume the state space consists just of one single dimension, a velocity. The system model 510 describes in that case how the velocity evolves over time. The state $x_k$, 512 i.e. the velocity, is estimated at epoch k and depends on the state $x_{k-1}$ 512. The state $x_k$ is therefore conditioned on $x_{k-1}$. Similarly, measurement models are special conditional distributions over the measurement $z_k$, which are conditioned on the state $x_k$: $p(z_k|x_k)$.

Often, the system models 510 and the measurement models 504 consist of a deterministic and a probabilistic part. The deterministic part is given by a mathematical function, which can be either linear or non-linear. The disclosed system allows both function types to be mapped. Additionally, non-linear models can be used by linearization. The probabilistic part can be either modeled by an arbitrary noise or an additive Gaussian white noise. The noise space 514 contains these values as a measurement noise vector.

Filters

Bayes filters combine the state space 512, the measurement space 505, the system model 510, and the measurement models 504 to recursively estimate the state of the system with the tracked object(s) using one or more sensors. If data from several ones of the sensors 101 are involved, this process is often referred to as "data fusion". The blocks 503, 511 and 506 in FIG. 5 representing the Bayes filters provide a PDF as their output. This is usually in the form of a Gaussian distribution.

The disclosed system enables the configuration of several implementation of Bayes filters, e.g. the linear Kalman filter, the extended Kalman filter, the unscented Kalman filter, and the particle filter by choosing the state space 512, system model 510, measurement space 505, measurement model 504, and uncertainty representation by choosing the appropriate combination A couple of examples can illustrate this point. A sampling based uncertainty representation requires the use of a particle filter. Non-linear system models or non-linear measurement models in combination with Gaussian uncertainty representation requires the use of an extended Kalman filter.

The system design is modular such that different ones of the filters 502, 508 and 513 can use the same models, e.g. to exchange measurement models 514, system models 510, state spaces 512, measurement spaces 505, or Bayes filter implementations 508. Each of the configurations of the filters 52, 508 and 513 is suitable for solving a variety of probabilistic problems, e.g. estimating the state of a single object like a vehicle traveling in front of a host vehicle, which is equipped with an ADAS. Depending on the complexity of the problem (e.g. linear vs. non-linear models), the appropriate one(s) of the filters 502, 508 and 513 can be chosen by selecting and implementing the corresponding state space 512, system model 510, measurement space 505, measurement model 504, and uncertainty representation.

Table 6 shows exemplary Bayes filters which (but not only) can be modeled by the disclosed system and their requirements to the state PDF, the system model, and the measurement model. The requirements to the models are provided by interfaces Conditional Probability Density Functions.

TABLE 6

Possible Bayes filter configurations

| | State PDF | System Model | Measurement Model |
|---|---|---|---|
| Kalman Filter | Gaussian | ILinearTransition, ILinearOnly, ICovariance | ILinearTransition, ILinearOnly, ICovariance |
| Extended Kalman Filter | Gaussian | ILinearTransition, IExpectation, ICovariance, IConditional | ILinearTransition, IExpectation, ICovariance, IConditional |
| Unscented Kalman Filter | Gaussian | IExpectation, IConditional | IExpectation, ICovariance, IConditional |
| Particle Filter | Arbitrary | IConditional, IDrawable | IConditional, IEvaluable |
| Discrete | Discrete | IConditional, IEvaluable | IConditional, IEvaluable |

Algorithm Configuration Verification

In the disclosed system, each one of the state spaces 512 is based on a common block. For each selection of physical quantities like position, heading, velocity, acceleration, a separate manifestation of the state space 512 is created. For example, a state space 512 of velocity and acceleration has the same dimensionality of a state space 512 of a one-dimensional position and heading. In the disclosed system, The different manifestations of the spaces can be discriminated against other manifestations of the spaces. This makes the handling of the spaces "type-safe". The term "type-space" means that two spaces 202 can be detected to be different, even if the number of dimensions in the space vector 203 is equal. The disclosed system becomes a "space-safe" configurable system.

The dimensions (i.e. the elements of the space) can be accessed with well-named public properties 205, 305, i.e. using the identifier instead of the vector 203, 303 or array index, as disclosed above. For example, let state be an instance of a Cartesian space, then the x dimension in the state can be accessed in the code by using the name X in 205 instead of the index 1 of vector 203. By using the names 205, 305, 405 the internal behavior of a block will remain the same even if the order of elements in the state is changed.

FIGS. 2 and 3 illustrate this. The elements of 202 and 302 can be access using the same interface (201 and 301), although the actual index in the space vectors 203 and 303 are different. The mapping between 205 and 203 is implemented by 204. Similarly, the mapping is implemented by 304 and 404. Furthermore, existing spaces can be extended by using the existing spaces as a base space and adding additional dimensions to base space.

The different blocks (e.g. the state space 512, the measurement space 505, the system model 510, the measurement model 504, and the uncertainty representation) of the disclosed system carry information about the properties of the different blocks, which is used on the interaction of two or more of the different blocks. For example, an interface of an expectation value from a Gaussian of state space type Cartesian in one of the blocks can be accessed by the system model 510 using an instance of a Cartesian state space only, and not by any other space, for example by a VelocitySpace.

Another example of the algorithm configuration verification is on changing the uncertainty representation of a state space. So-called Sigma-points are deterministic samples of and around the mean of a Gaussian, which enable more accurate non-linear transforms of Gaussians. The Sigma points of state space type Cartesian can be generated from a Gaussian of state space type Cartesian only, and vice versa (i.e. Gaussians of state space type Cartesian can be generated from Sigma points of state space type Cartesian). This checking is carried out by the software and ensures that only blocks and interfaces with the same space types can interact with each other, which allows a verification of the algorithmic configuration already when designing the system.

Parts of the spaces (e.g. elements 1 and 2 of 303 in the space 302) can be accessed through interfaces 301, which are also used by other spaces, e.g. interface 201 of space 202. The blocks of the disclosed system can then specify the interfaces 301 as constraints that the space needs to provide. For example, a system model 634 in the block 631 of FIG. 6 can specify that the system model 634 needs a Cartesian interface 201 in the used state space. The state space is used in the representation 635, 624 and 627. The different blocks of the system do not rely on only particular and concrete space but can be used with any space, which provides at least the required dimension. For example, the system model 634 outlined above, which requires a Cartesian interface of the state space, can work with the spaces 202 and 302. This results in an independence of the algorithms and the spaces and increases the testability of the algorithms.

The dimensions of the space contain additional meta information like a more descriptive display name, a description, and a unit of measurement, e.g. dimension in meters, velocity in m/s. The units can be used to formally verify that equations (e.g. in models) combine physical quantities in the correct way.

Configurable System for Tracking Multiple Objects

Figure 6:
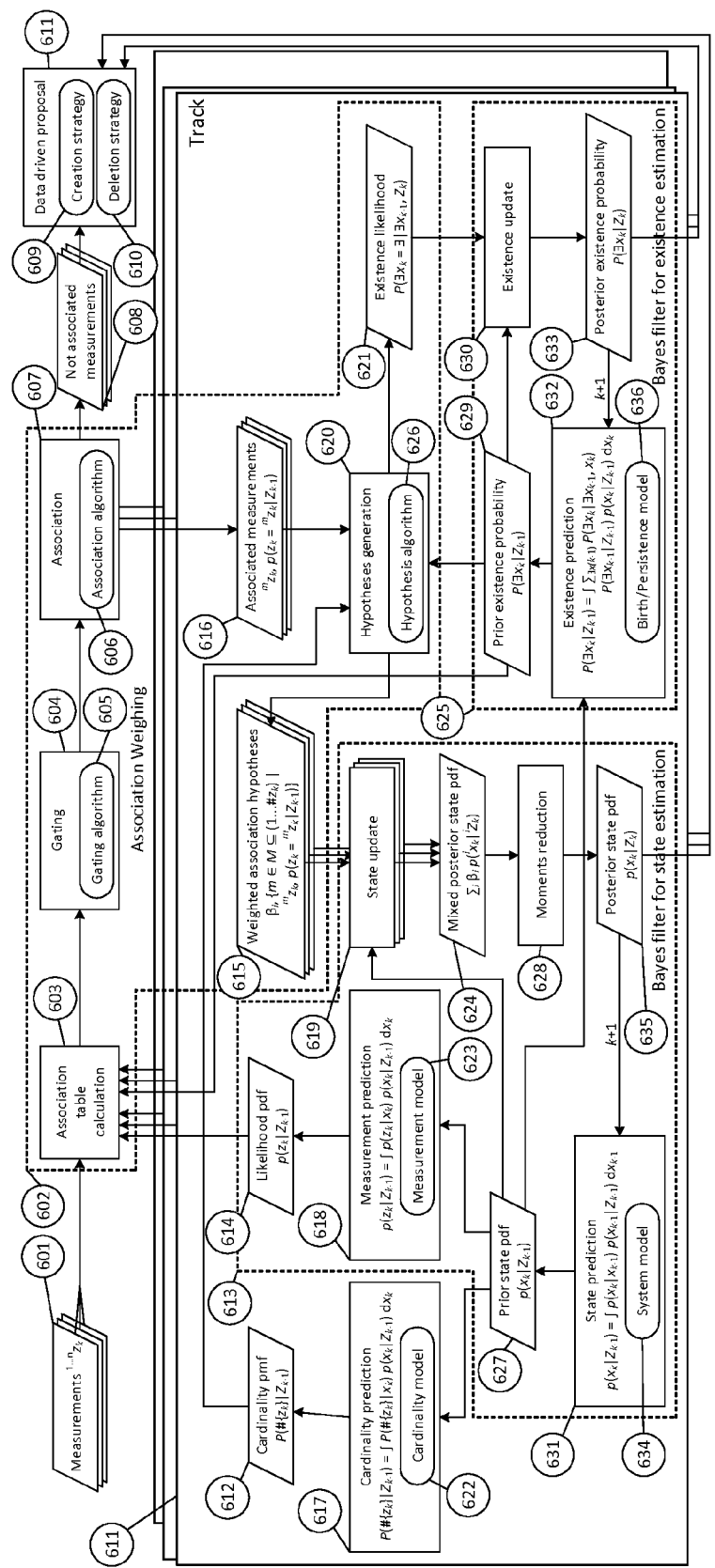
FIG. 6 shows the structure of a tracking system.

The structure of the configurable tracking system is depicted in FIG. 6. The rectangles of FIG. 6 represent the algorithmic parts of the tracker. The rounded boxes inside the rectangles indicate that the particular algorithm can be configured. Thus, the behavior of the tracker or even the tracking algorithm itself can be changed. The rhomboids indicate the data, which is transferred between the blocks. The overall algorithm can be divided into three sections, which are indicated by the dashed lines and described in the following sections.

The first part of the tracking system is the state estimation (104, 613); also show in FIG. 5. The state estimation 613 uses a Bayes filter, e.g. a variant of the Kalman filter, to estimate the state x of a track 611 in FIG. 6). A track represents the object whose state is to be estimated over time. This state estimation is done separately for each of the tracks in the track list 611, thus, the state estimation is located entirely inside the "Track" box. The structure is substantially similar to the one described in FIG. 5. The state is predicted from an epoch k−1 to an epoch k using a system model 634 and the equation given in block 631. The result of that operation is the prior state pdf 627. This prior state pdf 627 is then used for the prediction of measurements 618 using the measurement model ("Measurement prediction", 618). The result of that operation ("Likehood pdf", 614) is also referred to as likelihood integral, as the operation is calculated using the integral written in the "Measurement prediction" 618.

The state update differs from the one of a classical Bayes filter in that the state update is performed several times for each of the association hypothesis 615, which is provided by the hypotheses generation 620. The actual hypothesis generation algorithm 626 is configurable. Each hypothesis can contain an arbitrary number of measurements. For each association hypothesis 615, a posterior state 635 is calculated based on all measurements that the hypothesis contains. For the hypothesis with no measurements, no update is performed at all, but the prior state is used as posterior state directly. The weights of the posterior states are equal to the weight of their hypothesis. The weight of the hypotheses is given by the actual hypothesis algorithm. Together, the weighted posterior states form the mixed posterior state pdf ("Mixed posterior state pdf", 624). For example, in case of a Gaussian state pdf, the mixed posterior state pdf is a weighted sum of Gaussians. This Gaussian mixture is a sum of single Gaussians, each Gaussian given by the Kalman filter state update 619 based on the measurements assigned to the particular hypothesis. To get the final posterior state estimation 635, a moments reduction 628 can be performed. This step is optional. In case of a Gaussian mixture, for the moments reduction the expectation and covariance matrix of the pdf are calculated. The expectation and covariance matrix of the pdf then form the Gaussian representation of the posterior state. If no moments reduction took place, the mixed posterior state pdf 624 is directly equal to the posterior state pdf (shown by the Posterior state pdf rhomboid).

In addition to the Bayes filter, the distribution of measurement cardinality 612 is predicted 617 as well. For this prediction, the cardinality model $P(\#\{z_k\}|x_k)$ is used. The cardinality model provides the probability for a certain number of measurements given the prior state of the object. For most tracking techniques, this distribution contains only probabilities greater than zero for the values 0 and 1. In this case, $P(\#\{z_k\}=1)$ is the so-called detection probability of the sensor 101 and $P(\#\{z_k\}=0)=1-P(\#\{z_k\}=1)$. The detection probability is the probability that the movable object is detected by the sensor. As the prior state of the object is a condition, the dependency of the detection rate on the object state can be modeled. If, for instance, the movable object is outside the field of view of the sensor, the detection rate can be assumed to be zero. The model has to be marginalized over the prior state distribution in order to obtain $P(\#\{z_k\}|Z_{k-1})$. Marginalizing means that some of the dimensions of the prior state distribution are discarded. It is also possible to define a probability >0 for cardinalities greater than 1. The hypothesis generation has to support this case.

The disclosed system supports the creation of user defined cardinality models 622 by providing an abstract DetectionModel. By inheriting from that model and defining the evaluation of it, arbitrary distribution can be implemented and used in 622.

The existence estimation 625 uses a discrete Bayes filter for predicting 632 and updating 630 the existence probability of the track. The existence of the track with state x is denoted by $\exists x$ and can take two values: existent ($\exists$) and non-existent ($\not\exists$).

After the epoch k, the existence of the track is predicted 632 at the current time to get the prior existence 629 using the birth and persistence model $P(\exists x_k|\exists x_{k-1}, x_k)$ (36). The birth and persistence model specifies the probabilities that the track exists (or not exists) in the current epoch k given that the track has been existing (or not existing) in the previous epoch k−1. Two values have a special notation. The birth probability (k=0) is the probability that the track exists now given that the track has not been existing previously. The persistence probability is the probability that the track exists given that the track has already existed in the past (k<current time). As an additional condition, the prior track state of the track at the epoch k−1 can be used. For example, in the edges of the field of view of the sensor 101 the birth probability can be high, while the birth probability is low in the center, because the objects are unlikely to appear in the center suddenly. If the state is used as condition, a marginalization over the state must be performed—i.e. dimensions of the state have to be removed—in order to obtain $P(\exists x_k|Z_{k-1})$. It is also possible to not use a birth/persistence model. In that case, the prior existence is identical to the posterior one of the last epoch.

The update step 630 uses the existence likelihood $P(\exists x_k=\exists|\exists x_{k-1}, Z_k)$ (621) to update the existence. The update step 630 is provided by the hypothesis generation 620, as will be explained later. The likelihood is a discrete distribution and specifies the probabilities that the object exists now given all measurements 601 provided by one or more of the sensors 101 including the ones of the current time step. The update step 630 can be evaluated for the condition that the track existed in the previous epoch and for the condition that the object did not exist. With this likelihood, the Bayes update is performed to obtain the posterior existence distribution 633.

This association weighing of the tracking system uniquely assigns measurements to the tracks 611 of the tracking system. The measurements are delivered by the plurality of sensors 101 attached to the tracking system. Additionally, the association weighing provides the association hypotheses for the state update of the tracks of the tracking system as well as the existence likelihood for the existence update of the tracks of the tracking system. The association weighing comprises several steps, which are described in the following sections.

Association Table Calculation

The association table 603 contains the measurement likelihood 614 for each combination of a track 611 of the tracking system and a measurement 1 delivered by one of the sensors 101 attached to the tracking system. The likelihood integral for each track of the tracking system is evaluated at the measurement, resulting in the measurement likelihood 614. In order to take the uncertainty of the track existence into account, the evaluated measurement likelihood 614 of the track is multiplied with the existence probability 629 of the track.

Gating

Although it is not a necessary part of the tracking system, the gating 604 reduces the computational effort by excluding combinations of measurements delivered by the sensors 101 attached to the tracking system and tracks of the tracking system where the probability that the measurement was originated by the track is low. In other words, when one or more of the measurements from the sensor 101 is too far away from previous measurements forming the track (i.e. outlier measurements) it is very unlikely that the measurements belong together. Only the measurements that are inside a region around the predicted measurement of the track, the gate, are further considered and outlier measurements are discarded. In doing so, the tracking system can be adopted for computational constrains of the ADAS in which the tracking system shall be used. This is necessary if the sensor 101 delivers a comparably large number of measurements as input to the system.

The gating algorithm 605 is represented by a block implementing the IGating<TTrack> interface. The argument TTrack is a generic argument to the gating algorithm block 605.

The tracking system can be used with different types of the gating algorithms in the gating algorithm block 605. The following manifestations are examples.

The first example is the "density gating". This gating algorithm rejects all of the measurements delivered by the sensors 101 attached to the system whose likelihood value is below a threshold. This method has no constraints on the "Likelihood pdf" representation (i.e. e.g. Gaussian or sample based) of the track, as the method only uses the values in the association table. The gate probability is estimated empirically by dividing the number of remaining measurements by the number of all associated measurements. The gate hypervolume cannot be calculated and is constantly returned as one. The hypervolume is a volume of arbitrary dimension. Both the gate hypervolume and the gate probability are considered by some implementations of hypothesis generation algorithms 626 in the hypotheses generation 620.

The second algorithm uses the Mahalanobis distance as a distance measure between the track and the measurement and rejects all associations where the Mahalanobis distance is greater than a threshold (referred to as "Mahalanobis gating"). For using this algorithm, the track has to implement the IGaussianLikelihoodIntegral interface, as the Mahalanobis distance is defined for Gaussian distributions only. The method provides two ways for specifying the threshold. One is specifying the squared value of the maximum distance $d_{max}^2$. The gate probability $P_G$ is calculated from this value by $$P_G = 1 - \frac{1}{\Gamma\left(\frac{m}{2}\right)} \int_{\frac{d_{max}^2}{2}}^{\infty} e^{-t} t^{\frac{m}{2}-1} dt,$$

where m denotes the number of assigned Measurements and $\Gamma(\cdot)$ is the gamma function.

The hypervolume of the gate V is then calculated using the following equation:

$$V = \frac{(\pi d_{max}^2)^{\frac{m}{2}} |S|}{\Gamma\left(\frac{m}{2}+1\right)}$$

Here, S denotes the covariance matrix of the Gaussian likelihood integral, i.e. the predicted measurement.

Association

This step 607 performs the final association of measurements and tracks. While the gating 604 rejects associations of measurements and tracks based on a single one of the tracks, the association takes the whole association table 603 into account. The result of this step is a list of assigned measurements for each one of the tracks 616 and a list of not assigned measurements 608, which can be stored in an array in memory.

Association algorithms 606 are be provided by defining the functionality of a so-called IAssociator interface. The IAssociator interface exposes the method GetAssociatedMeasurements( ) that obtains the association table 603 as parameter. Due to the previous gating step, some of the entries in the association table 603 can be NaN.

A common association method 606 defined in the IAssociator interface of 607 is the local nearest neighbor (LNN) algorithm. The LNN algorithm assigns a measurement to its nearest track, i.e. the track with the greatest likelihood value. The measurement is assigned to at most one track. If the measurement is outside the gates of all of the tracks, its index is added to the list of not assigned measurements 608.

Association Hypotheses Generation

The last part of the association weighing creates association hypotheses 615. The association weight is performed separately for each one of the tracks. Each association hypothesis 615 comprises a subset of the associated measurements 616 and a weight. This subset can also be the empty set; this particular hypothesis is also referred to as clutter hypothesis, as it supposes all measurements to be false positives. The implementation of the association hypotheses generation 626 determines majorly the resulting tracking algorithm.

In the tracking system, every algorithm that defines the functionality of the IHypothesizer interface can serve as a hypotheses generator. The interface IHypothesizer exposes the method FillAssociationHypotheses. The first parameter of this IHypothesizer interface is the track. Its type is not fixed, though it has to define the functionality IMeasurementLikelihoods, IAssociationHypotheses, and IExistence. As a second parameter, the list of associated measurements is provided. Each element of the list contains the measurement and the evaluated likelihood integral, i.e. the value of the predicted measurement pdf at the actual measurement. As additional information, the gate hypervolume and the gate probability are provided. The disclosed system can for example be used with one of the four hypothesizers:

Sequential probability ratio testing (SPRT): SPRT assumes that the object can generate at most one measurement. The SPRT cannot handle more than one associated measurement per object. Thus, if more than one measurement is associated with the object, the measurement with the greatest evaluated likelihood integral 614 is chosen. The remaining measurements are added to the list of unassigned measurements 608. That also implies that the cardinality likelihood 612 should be zero for other values than zero and one. This can be achieved by deriving the used cardinality model from UniqueDetectionModel.

SPRT has the false alarm probability $P_F$ as parameter. $P_F$ denotes the probability that a measurement has been created without an existing object. Thus, this can be seen as a simple clutter model that assumes that at most one spatially equally distributed clutter measurement can occur within the gate of the track.

If no measurement has been assigned, the algorithm generates no hypothesis. Hence, no update 619 of the track state is performed and the posterior state 635 is equal to the prior state 627. The existence likelihood is set as follows:

$P(\exists x_k = \exists | \exists x_{k-1} = \exists) = P(\#\{z_k\} = 0) = 1 - P_D$ $P(\exists x_k = \exists | \exists x_{k-1} = \exists) = 1 - P_F$ If a measurement has been assigned to the track, one hypothesis 615 is created with this measurement and the weight 1. The existence likelihood is set to the following values:

$P(\exists x_k = \exists | \exists x_{k-1} = \exists) = P(\#\{z_k\} = 1) = P_D$ $P(\exists x_k = \exists | \exists x_{k-1} = \exists) = P_F$ Integrated probabilistic data association (IPDA): IPDA implements the integrated probabilistic data association (IPDA) algorithm with Poisson distributed clutter cardinality. In contrast to SPRT, more than one measurement can be assigned to one of the tracks and, therefore, no measurements are rejected by the hypothesizer 620. The main assumption is that at most one of the assigned measurements 616 originates from the object, while the others are clutter. Like for SPRT, the cardinality distribution should be non-zero only for #$\{z_k\}$=0 and #$\{z_k\}$=1. The gate probability should be incorporated into the cardinality model, for instance, by defining P(#$\{z_k\}$=1)=$P_D P_G$.

For IPDA, different distributions for the clutter cardinality can be used. This class uses a Poisson distribution for modeling the clutter cardinality. Its parameter $\lambda$ is the only parameter of the IPDA algorithm. Using the Poisson distribution is a direct consequence of the assumption that clutter measurements are relatively rare events that are spatially uniform distributed over the whole field of view of the sensor. From the law of small numbers it follows that the number of clutter events inside a relatively small region of the field of view— the gate of the track for instance—follows a Poisson distribution. The parameter $\lambda$ specifies the mean number of clutter measurements inside a unit hypercube of the field of view.

With m being the number of assigned measurements 616, IPDA generates m+1 hypotheses 615: m with one of the measurements 616 and the clutter hypothesis with no measurements. The weights of each hypothesis are calculated using the evaluated likelihood integrals 614 of the corresponding measurements, the existence probability 629 of the track and the parameter $\lambda$. With the abbreviations $P_D$=P (#$\{z_k\}$=1) and $P_E$=P($\exists x_k$=$\exists$), the auxiliary parameter $\delta$ is calculated by $$\delta = P_D\left(1 - \lambda^{-1}\sum_{i=1}^{m} \Lambda_k^i\right).$$

Here, $\Lambda_k^i$ denotes the evaluated likelihood integral of the ith measurement. The weight of the clutter hypothesis is $$\beta_0 = \frac{1 - P_E P_D}{1 - \delta P_E},$$

The weights of the other hypotheses are $$\beta_i = \frac{\Lambda_k^i P_E P_D \lambda^{-1}}{1 - \delta P_E}.$$

The existence likelihood given existence is also calculated using $\delta$, while the likelihood given the track is non-existent is always unity:

$P(\exists x_k=\exists|\exists x_{k-1}=\exists)=1-\delta$ $P(\exists x_k=\exists|\exists x_{k-1}=\exists)=1$ IPDA with uniform clutter: IPDA with uniform clutter is similar to the previously described IPDA, except that IPDA with uniform clutter assumes a uniform distribution for the clutter cardinality. IPDA with uniform clutter should be used if the gate is not relatively small in comparison to the field of view of the sensor. As IPDA with uniform clutter does not have any parameter, IPDA with uniform clutter can also be used if the parameter $\lambda$ of the Poisson distribution is unknown.

The formulae for the weights and the existence likelihood of IPDA with uniform clutter are almost identical to the ones of IPDA with Poisson clutter. They are obtained by replacing $\lambda^{-1}$ with $$\frac{V_G}{m},$$

where $V_G$ denotes the hypervolume of the gate.

General probabilistic data association (GPDA): GPDA allows that more than one measurement to originate from one track. Thus, one association hypothesis can contain up to m measurements. Like IPDA, GPDA assumes a Poisson clutter cardinality distribution and, therefore, has the parameter $\lambda$. The second parameter, which has to be set, is the maximum number of measurements for one hypothesis $\overline{m}$. If this value is set to one, the algorithm is identical to IPDA. For the sake of brevity, it is abstained from providing the formulae for the weights and the existence likelihood.

If $\overline{m}$ is greater than or equal to the number of measurements, the algorithm generates $$n_H = \sum_{k=0}^{m} \binom{m}{k} = 2^m$$

hypotheses including the clutter hypothesis. For all hypotheses with more than one measurement, a sequential update of the state needs to be performed. Its runtime increases linearly with the number of measurements. The total number of assigned measurements over all hypotheses and, therefore, the total number of single updates is $$n_U = \sum_{k=0}^{m} \binom{m}{k} k = m 2^{m-1}.$$

Track Representation
Interfaces

The disclosed tracking system holds a list of the individual tracks. Each of the tracks is represented by a various number of properties. The individual parts (e.g. State prediction 631, measurement prediction 618, gating 604, all blocks of FIG. 6) of the tracking system have specific requirements on the tracks. The interface requirements on the interfaces of the blocks of the tracking system shown in FIG. 6 were described above. The interface requirements may also differ between different configurations of the algorithms. For example, a "Mahalanobis gating" in 605 requires the Likelihood pdf 614 to be a Gaussian distribution, while "Density gating" has no constraint on the pdf representation. The requirements on the interfaces of the blocks of the tracking system shown in FIG. 6 are expressed by interfaces that the actual track must provide.

In the following section, the interfaces contained in the tracking system are described. Tracks implement interfaces required by the blocks of the tracking system shown in FIG. 6.

Additionally, custom interfaces can be defined for custom track definitions. This is used when the track definition of a tracking system need to be adapted to changing requirements if the ADAS in which the tracking system is used.

IID This interface exposes the property ID of type which is used to identify a track. The IID should be set to a unique number. A consecutive numbering from the beginning of the program is useful.

IGaussianState<TStateSpace> This interface is used for tracks whose state is represented by a Gaussian distribution. The exposed property State is of type Gaussian<TStateSpace>.

IMeasurementLikelihoods<TMeasurementSpace> exposes the two results of the measurement prediction. The first one is the LikelihoodIntegral which can be an arbitrary distribution defining the functionality of IEvaluable<TMeasurementSpace>. The second one is the CardinalityLikelihood of type IEvaluable<CardinalitySpace>. This distribution specifies how likely a certain number of measurements is based on the prior state.

IExistence The interface exposes two properties needed for the existence estimation of a track. The first one is the estimated probability distribution of the existence, represented by the property Existence of type TwoPointDistribution<ExistenceSpace>. The second property is the existence likelihood. This is filled by the hypothesis generation and is needed for updating the existence estimation.

IAssociationHypotheses<TMeasurementSpace> This interface contains the list of association hypotheses for the track. Each hypothesis consists of a weight and a various number of associated measurements and the evaluated likelihood integral for this measurement. This number can also be zero, which means that no measurements are assigned in his hypothesis. It is filled by hypotheses generation.

IGaussianLikelihoodIntegral<TMeasurementSpace> This is a special interface for tracks where the likelihood integral, i.e. the predicted measurement is represented by a Gaussian distribution. Like IMeasurementLikelihoods<TMeasurementSpace>, it exposes the LikelihoodIntegral property, but of type Gaussian<TMeasurementSpace>.

IUKFTrack<TStateSpace, TMeasuremenSpace> is based on IGaussianState<TStateSpace> and is intended to be used for tracks when the Bayes filter for state estimation is an unscented Kalman filter. It contains the predicted state and the predicted measurement as sigma point distributions.

Track Implementation

A commonly used Bayes filter for the state estimation is the Unscented Kalman Filter. The functionality all of the interfaces listed above and provides some inner logic for common tasks may be defined as follows:

The ID is initiated automatically during instantiation with a consecutive number.

The existence probability is initialized with ½.

Proposer

The proposer 611 creates and deletes tracks using a configurable track creation strategy 609 and a configurable track deletion strategy 610. Creating a track means creating a new instance of 611. The proposer 611 can create an arbitrary large number of tracks with random states and an existence probability of ½. If enough of these track hypotheses are created, by pure chance, some of the track hypothesis will have a similar state like the real objects. These track hypotheses will get measurements associated, while the rest gets no measurements and, therefore, their existence probability will decrease and their state covariance will increase.

Though this proposer 611 with no knowledge works well in theory, due to the computational limitations of practical systems it is advisable to reduce the number of created tracks by using a data driven proposal approach. The data driven proposal approach uses the not assigned measurements 618 to create new tracks. For this, the not-assigned measurements are converted into the state space using an inverse measurement model. In contrast to the measurement model, which transforms system space to measurement space, the inverse measurement model is able to take the values of the not-assigned measurements and create from the not-assigned measurements an object's state. Therefore, for each not-assigned measurement, a Gaussian distribution with the measurement as expectation and the measurement noise as covariance matrix is created and transformed into the state space using the inverse measurement model. However, the state space may contain hidden states that do not affect the measurement. One example of a hidden state is the velocity of the object, that can be part of the state vector, though it does not influence the measurement of the position of the object. The dimensions relating to the hidden states will not be transformed and, thus, have an expectation and variance of zero. In other words, the dimensions corresponding to the hidden states are considered to be exactly known, as the dimensions have zero variance.

A track can also be removed from the track list determined by a deletion strategy (10). For example, if a track has not been updated for a long time, it can be assumed that the object represented by the track has left the field of view of the sensor. Indicators for this are a low existence probability or a high variances of the state estimation. For both a threshold can be specified. If the track's existence is below or the variance is above, respectively, the track is deleted from the track list.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A system for tracking one or more movable objects comprising:
one or more sensors recording object measurement data and passing the recorded object measurement data to a memory;
a measurement space located in the memory for storing a plurality of measurement vectors representative of the recorded object measurement data, wherein the measurement space has a plurality of dimensions, the dimensions having a dimension identifier;
a state space located in the memory for storing a plurality of state vectors representative of the state of the object, wherein the state space has a plurality of dimensions, the dimensions having a dimension identifier;
a measurement noise space located in the memory for storing a plurality of measurement noise vectors representative of uncertainties in the object measurement data;
a system model having a system deterministic part and a system probabilistic part and being stored in the memory, the system model being representative of the one or more movable objects;
a measurement model having a measurement deterministic part and a measurement probabilistic part and being stored in memory; and
a processor configured to update the system model based on a previous system model and using at least an updated one of the measurement vectors, the measurement noise vectors or the state vectors.

2. The system of claim 1, wherein the processor comprises a plurality of Bayes filter implementations to update the system model.

3. The system of claim 1, wherein the system model comprises a plurality of tracks and the processor is configured to associate one or more of the object measurement data with one or more of the plurality of tracks and to assign probability that the assigned one of the measurement data is correctly assigned to a correct one of the plurality of tracks.

4. The system of claim 1, further comprising a gating configured to review the recorded object measurement data and pass to the measurement space only those object measurement data falling within a threshold level.

5. A method for tracking one or more movable objects comprising:
- recording object measurement data of the one or more movable objects;
- creating in memory measurement vectors representative of the recorded object measurement data;
- creating in memory state vectors representative of the state of the object;
- creating in memory measurement noise vectors representative of uncertainties in the object measurement data;
- accessing a system model having a system deterministic part and a system probabilistic part and a measurement model having a measurement deterministic part and a measurement probabilistic part; and
- updating the system model using at least an updated one of the measurement vectors, the measurement noise vectors or the state vectors.

6. The method of claim 5, further comprising eliminating all of the object measurement data falling outside of a threshold value.

7. The method of claim 5, further comprising associated at least one or more of the object measurement data to one or more tracks in the system model and calculating the probability that the assigned one of the object measurement data is correctly assigned to the correct one of the tracks.

8. A vehicle assistance system comprising system for tracking one or more movable objects in the neighborhood of a vehicle comprising:
- one or more sensors recording object measurement data and passing the recorded object measurement data to a memory;
- a measurement space located in the memory for storing a plurality of measurement vectors representative of the recorded object measurement data, wherein the measurement space has a plurality of dimensions, the dimensions having a dimension identifier;
- a state space located in the memory for storing a plurality of state vectors representative of the state of the object, wherein the state space has a plurality of dimensions, the dimensions having a dimension identifier;
- a measurement noise space located in the memory for storing a plurality of measurement noise vectors representative of uncertainties in the object measurement data;
- a system model having a system deterministic part and a system probabilistic part and being stored in the memory, the system model being representative of the one or more movable objects;
- a measurement model having a measurement deterministic part and a measurement probabilistic part and being stored in memory; and
- a processor configured to update the system model based on a previous system model and using at least an updated one of the measurement vectors, the measurement noise vectors or the state vectors.

\* \* \* \* \*